UNITED STATES PATENT OFFICE.

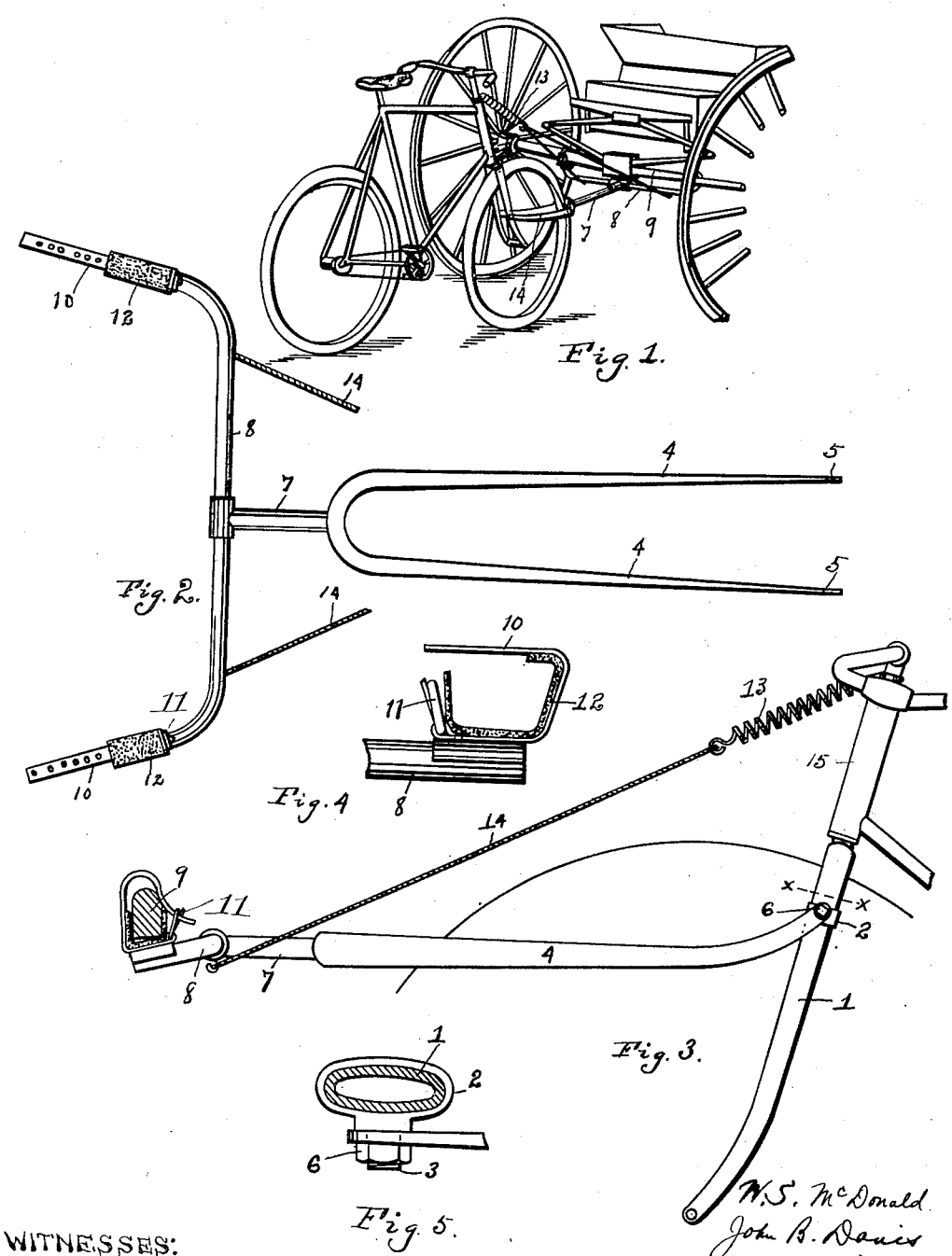

WINFIELD SCOTT McDONALD AND JOHN B. DAVIS, OF DAYTON, OHIO, ASSIGNORS OF ONE-THIRD TO JNO. F. BRINKMAN, OF TERRE HAUTE, INDIANA.

BICYCLE ATTACHMENT FOR LEADING BICYCLES.

SPECIFICATION forming part of Letters Patent No. 656,998, dated August 28, 1900.

Application filed July 2, 1900. Serial No. 22,263. (No model.)

*To all whom it may concern:*

Be it known that we, WINFIELD SCOTT MC-DONALD and JOHN B. DAVIS, citizens of the United States, residing at Dayton, in the county of Montgomery and State of Ohio, have invented certain new and useful Improvements in Bicycle Attachments; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to bicycle attachments, and comprises means for leading a bicycle in the rear of a vehicle.

The invention is especially adapted for the use of liverymen, who in sending a vehicle out of the stable are required to send a man with it to deliver it and to provide street-car fare for the return of such person to the stable after the delivery of the vehicle. In the course of time this expense amounts to considerable. Therefore it is the object of the present invention to avoid such expense by providing means for accompanying the vehicle with a bicycle, which may be attached and led in an upright position in the rear of such vehicle and upon which the person delivering the vehicle may return, as will be hereinafter shown and described.

In the accompanying drawings, Figure 1 is a perspective view of the rear portion of a vehicle, showing a bicycle attached thereto by means of our improved attachment. Fig. 2 is an enlarged plan view of the attachment detached from both the bicycle and the vehicle. Fig. 3 is an enlarged elevation of the attachment, showing it connected to the front fork of the bicycle and to the rear shaft of the vehicle. Fig. 4 is an enlarged view of one end of the attachment which connects with the vehicle-shaft. Fig. 5 is an enlarged section on the line $x\ x$ of Fig. 3.

In the specification similar reference characters indicate corresponding parts in the several views.

1 designates the front forks of the bicycle, each arm of which is surrounded by a clamp 2, which is brazed or otherwise securely attached to said fork near or at a point shown in Fig. 3. Each of these clamps 2 has an integral screw or stem 3 projecting from its outer side.

The attachment proper comprises a fork the two arms 4 of which have openings 5 in their ends, which fit over the screws 3 and are maintained in position by nuts 6, which screw onto said screws 3. The fork 4 has a stem 7, which is brazed to a cross-bar 8, the ends of which are curved to bring them in proper position below the rear shaft 9 of a vehicle, as shown in Fig. 1. Each of the ends of such cross-bar 8 is provided with a strap 10 and buckle 11, by means of which the said cross-bar 8 is securely fastened to the rear shaft of the vehicle. The inner portions of the straps 10 are provided with a piece of felt 12 or other soft material, which prevents any marring of the surface of the vehicle-shaft 9.

13 is a coil-spring which is hooked onto the steering-head 15 of the bicycle and has attached to it a rope or other flexible connection 14, which is secured to the cross-bar 8 on each side of the stem 7 and at suitable distances from said stem. This flexible or yielding connection between the steering-head of the bicycle and the cross-bar 8 of the attachment permits of a suitable yielding of the connection under the vibrations that are imparted to the bicycle-frame while it is being led in the rear of a vehicle. The fork 4 maintains the front or steering wheel of the bicycle in an upright position in turning corners, as well as when traveling in a straight direction. In turning corners the yielding or flexible connections 13 and 14 allow the frame of the bicycle to change position and maintain said frame in an upright position at the same time. When the vehicle is delivered, the attendant detaches the bicycle and elevates the attachment on the pivots 3 to a position parallel with the handle-bars of the bicycle to which said attachment may be secured out of the way of the rider of the bicycle.

Having described our invention, we claim—

1. An attachment for leading bicycles in the rear of a vehicle, consisting of a fork, and a cross-bar, the former being adapted to be attached to the steering-fork of a bicycle on each side of the front wheel, the cross-bar having outwardly-curved ends adapted to be secured to the rear shaft of a vehicle and a flexible connection between the steering-head of the bicycle, and said cross-bar, substantially as shown and described.

2. In an attachment for leading a bicycle in the rear of a vehicle, the combination with the front forks of a bicycle, of a fork inclosing the front wheel of the bicycle, the said fork being attachable to the front fork of a bicycle on both sides of the steering-wheel, an extension 7, a cross-bar 8 to which said extension is attached, the said cross-bar having its ends curved outwardly, straps secured to the ends of said cross-bar and adapted to be secured to the rear shaft of a vehicle, a spring connected to the steering-head of the bicycle, and a flexible connection between said spring and the cross-bar 8 on each side of the extension 7, substantially as shown and for the purposes specified.

In testimony whereof we affix our signatures in presence of two witnesses.

WINFIELD SCOTT McDONALD.
JOHN B. DAVIS.

Witnesses:
R. N. BRUMBOUGH,
R. J. McCARTY.